(12) United States Patent
Fields, Jr. et al.

(10) Patent No.: US 8,161,245 B2
(45) Date of Patent: Apr. 17, 2012

(54) METHOD AND APPARATUS FOR PERFORMING DATA PREFETCH IN A MULTIPROCESSOR SYSTEM

(75) Inventors: James S. Fields, Jr., Austin, TX (US); Benjiman L. Goodman, Cedar Park, TX (US); Guy L. Guthrie, Austin, TX (US); Jeffrey A. Stuecheli, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1361 days.

(21) Appl. No.: 11/054,173

(22) Filed: Feb. 9, 2005

(65) Prior Publication Data

US 2006/0179237 A1   Aug. 10, 2006

(51) Int. Cl.
*G06F 13/00* (2006.01)
*G06F 13/28* (2006.01)
*G06F 15/00* (2006.01)

(52) U.S. Cl. ........................ 711/137; 712/207
(58) Field of Classification Search ............ 712/207; 711/137
See application file for complete search history.

(56) References Cited

U.S. PATENT DOCUMENTS

| | | | |
|---|---|---|---|
| 2002/0069341 A1* | 6/2002 | Chauvel et al. | 711/207 |
| 2004/0148471 A1* | 7/2004 | Wallin et al. | 711/137 |
| 2004/0260883 A1* | 12/2004 | Wallin et al. | 711/137 |
| 2005/0080997 A1* | 4/2005 | Hooker | 711/137 |

OTHER PUBLICATIONS

Seznec, Andre, Decoupled Sectored Caches, Feb. 1997, IEEE Transactions on Computers, vol. 46, No. 2.*

* cited by examiner

*Primary Examiner* — Edward Dudek, Jr.
(74) *Attorney, Agent, or Firm* — Yudell Isidore Ng Russell PLLC

(57) ABSTRACT

A method and apparatus for performing data prefetch in a multiprocessor system are disclosed. The multiprocessor system includes multiple processors, each having a cache memory. The cache memory is subdivided into multiple slices. A group of prefetch requests is initially issued by a requesting processor in the multiprocessor system. Each prefetch request is intended for one of the respective slices of the cache memory of the requesting processor. In response to the prefetch requests being missed in the cache memory of the requesting processor, the prefetch requests are merged into one combined prefetch request. The combined prefetch request is then sent to the cache memories of all the non-requesting processors within the multiprocessor system. In response to a combined clean response from the cache memories of all the non-requesting processors, data are then obtained for the combined prefetch request from a system memory.

15 Claims, 8 Drawing Sheets

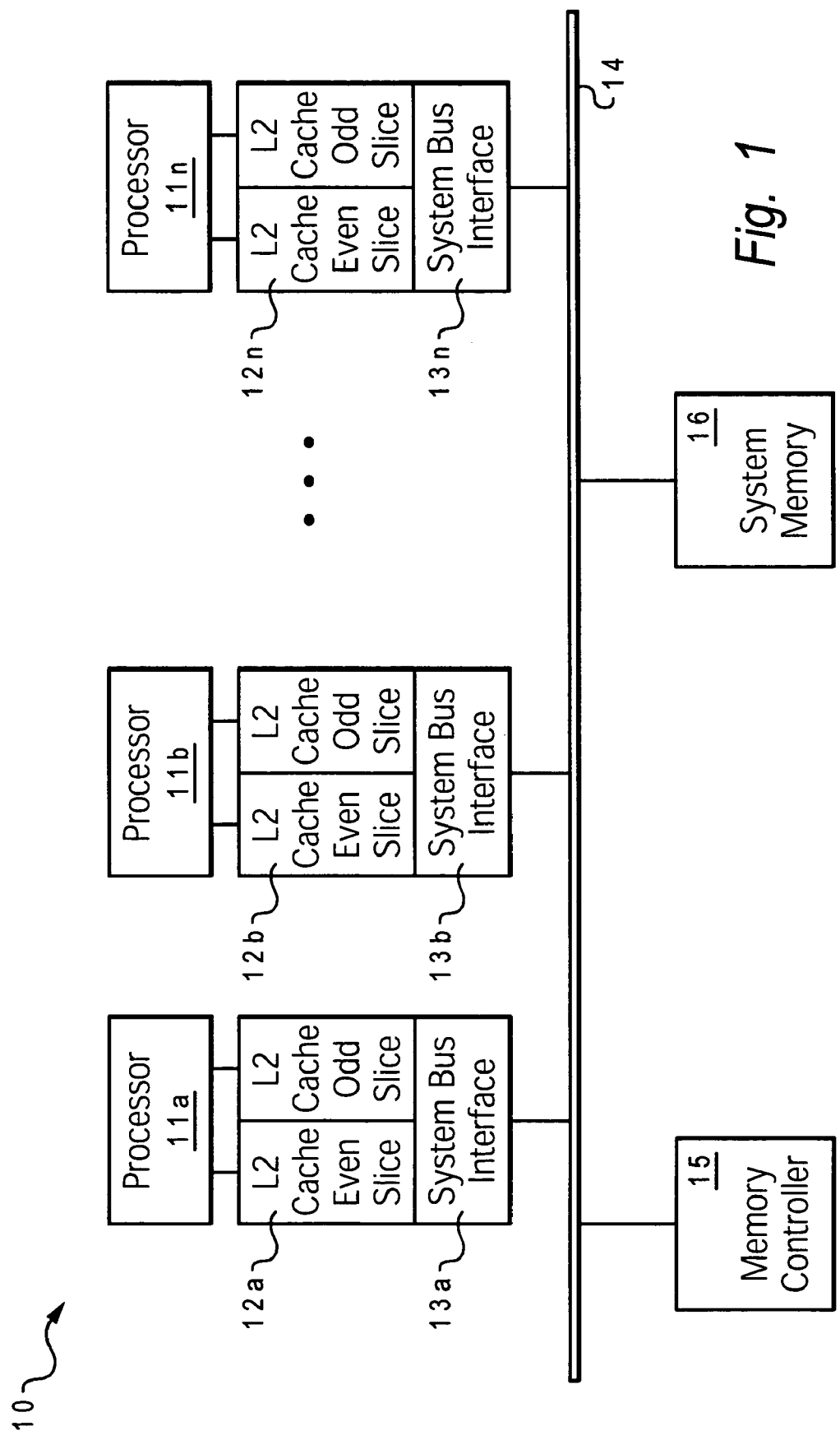

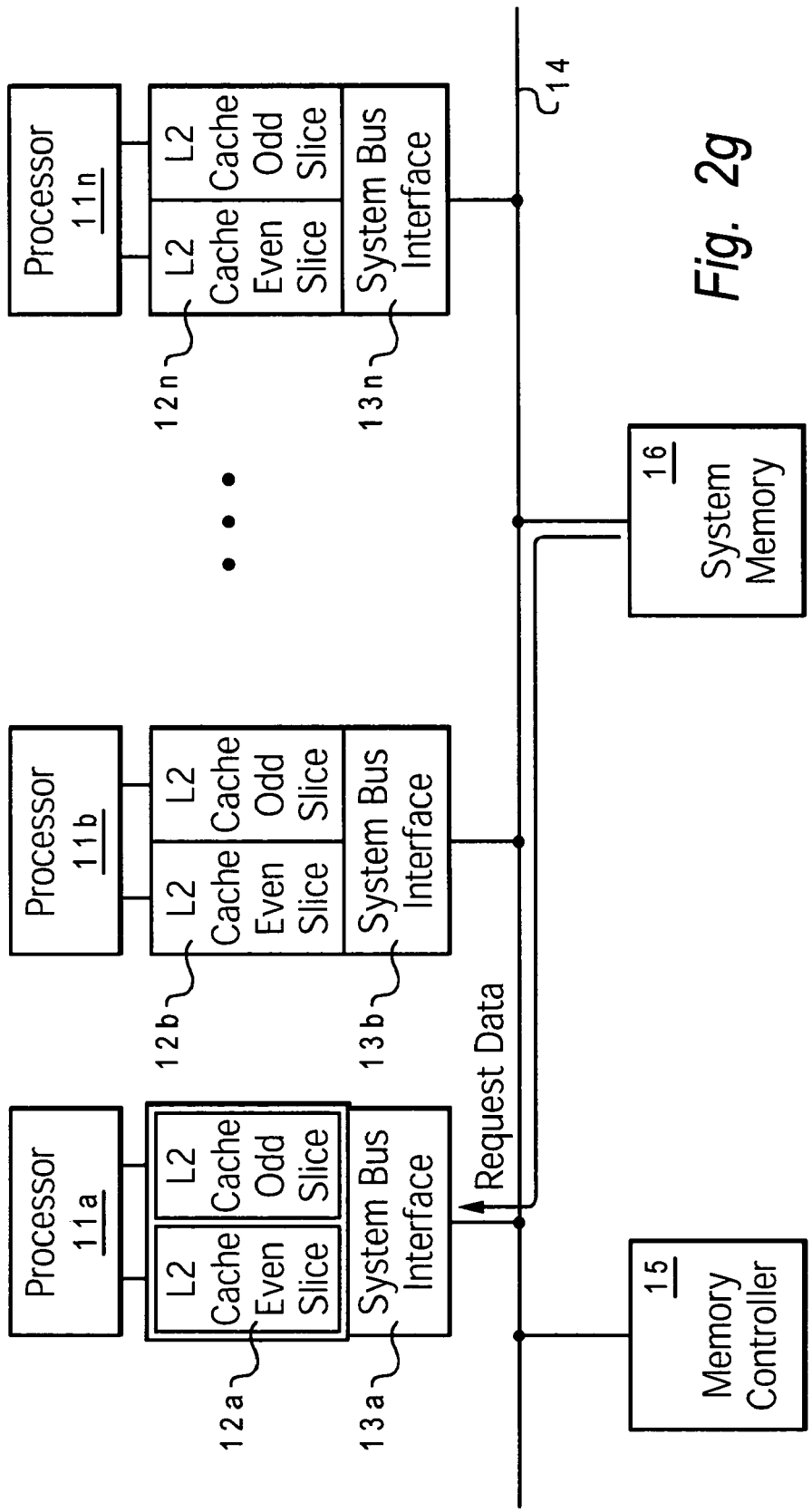

METHOD AND APPARATUS FOR PERFORMING DATA PREFETCH IN A MULTIPROCESSOR SYSTEM

BACKGROUND OF THE INVENTION

1. Technical Field

The present invention relates to data prefetching in general, and, in particular, to a method and apparatus for performing data prefetch. Still more particularly, the present invention relates to a method and apparatus for performing data prefetch in a multiprocessor system.

2. Description of Related Art

A processor commonly includes a cache memory for storing data that are most recently accessed by the processor. When the processor requires data from a system memory, the processor first checks its cache memory to determine if the data are available locally. If the data are available in the cache memory and are valid, the processor can immediately use the data from the cache memory. However, if the data are not present in the cache memory or are invalid, then the processor must access the system memory to retrieve the data.

By using prefetching techniques, a cache memory can request data from a system memory before a processor makes a request for the data. In other words, data required by the processor can be retrieved from the system memory before the processor requires the data. By prefetching data ahead of data consumption by the processor, data can be continuously supplied to the processor without interruption. Prefetch operations allow more time for the system memory to access and provide data in anticipation of upcoming processor requests, thereby enhancing overall system performance.

The amount of time necessary for a processor to access a system memory is called memory latency. In order to maximize the efficiency of the processor, the amount of data that needs to be prefetched can be determined by the speed of the processor relative to the memory latency. Faster processors tend to benefit from a larger amount of prefetched data, particularly when memory latency is high.

However, prefetch operations also have their drawbacks. Prefetch operations are speculative in nature; thus, if the prefetched data are not ultimately utilized by the processor, then time and input/output resources will be wasted. In addition, prefetch activities consume bus bandwidth that could have been better utilized for fetching other data that are actually requested by the processor.

The present disclosure provides an improved method and apparatus for performing data prefetch in a multiprocessor system.

SUMMARY OF THE INVENTION

In accordance with a preferred embodiment of the present invention, a multiprocessor system includes multiple processors, each having a cache memory. The cache memory is subdivided into multiple slices. A group of prefetch requests is initially issued by a requesting processor in the multiprocessor system. Each prefetch request is intended for one of the respective slices of the cache memory of the requesting processor. In response to the prefetch requests being missed in the cache memory of the requesting processor, the prefetch requests are merged into one combined prefetch request. The combined prefetch request is then sent to the cache memories of all the non-requesting processors within the multiprocessor system. In response to a combined clean response from the cache memories of all the non-requesting processors, data are then obtained for the combined prefetch request from a system memory. The data are then sent back to each slice of the cache memory of the requesting processor accordingly.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 1 is a block diagram of a multiprocessor system in which a preferred embodiment of the present invention can be implemented;

FIGS. 2a-2g graphically illustrate a method for performing data prefetch in the multiprocessor system from FIG. 1, in accordance with a preferred embodiment of the present invention; and FIG. 3 is a block diagram of a prefetch request, in accordance with a preferred embodiment of the present invention.

DETAILED DESCRIPTION OF A PREFERRED EMBODIMENT

Figure 2A:
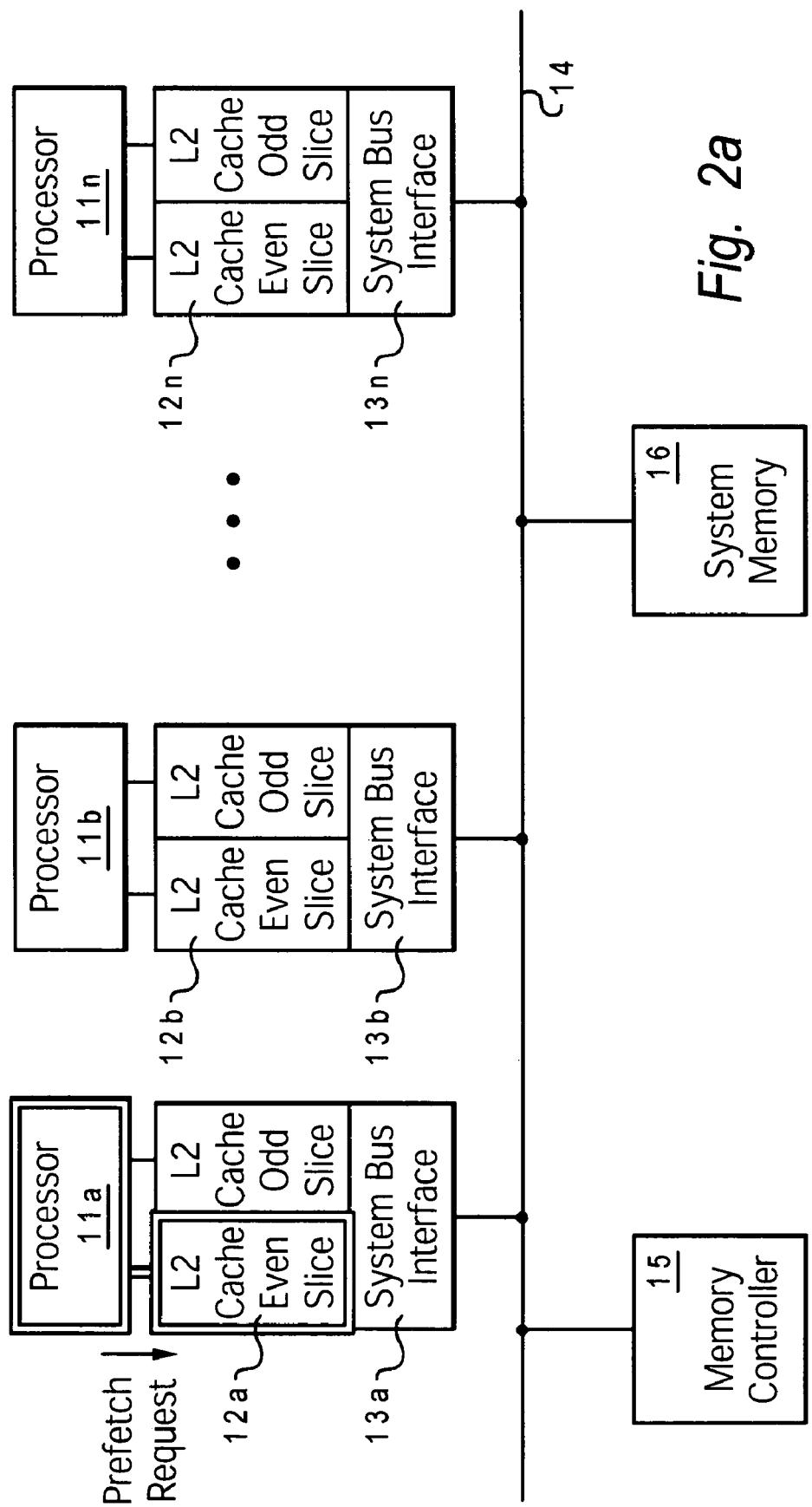

Referring now to the drawings and in particular to FIG. 1, there is depicted a block diagram of a multiprocessor system in which a preferred embodiment of the present invention may be implemented. As shown, a multiprocessor system 10 includes processors 11a-11n. Each of processors 11a-11n contains a level 1 (L1) cache memory (not shown). Each of processors 11a-11n is also associated with one of level 2 (L2) cache memories 12a-12n, respectively. For the present embodiment, each of L2 cache memories 12a-12n is organized as two slices, namely, an even slice and an odd slice. L2 cache memories 12a-12n are coupled to an interconnect 14 via a respective one of system bus interfaces 13a-13n. A memory controller 15 and a system memory 16 are also connected to interconnect 14.

Each of L2 cache memories 12a-12n is capable of prefetching data from system memory 16 before its associated one of processors 11a-11n makes a request for the data. If data prefetch operations are successful, data can be continuously supplied to processors 11a-11n without any interruption.

Figure 2B:
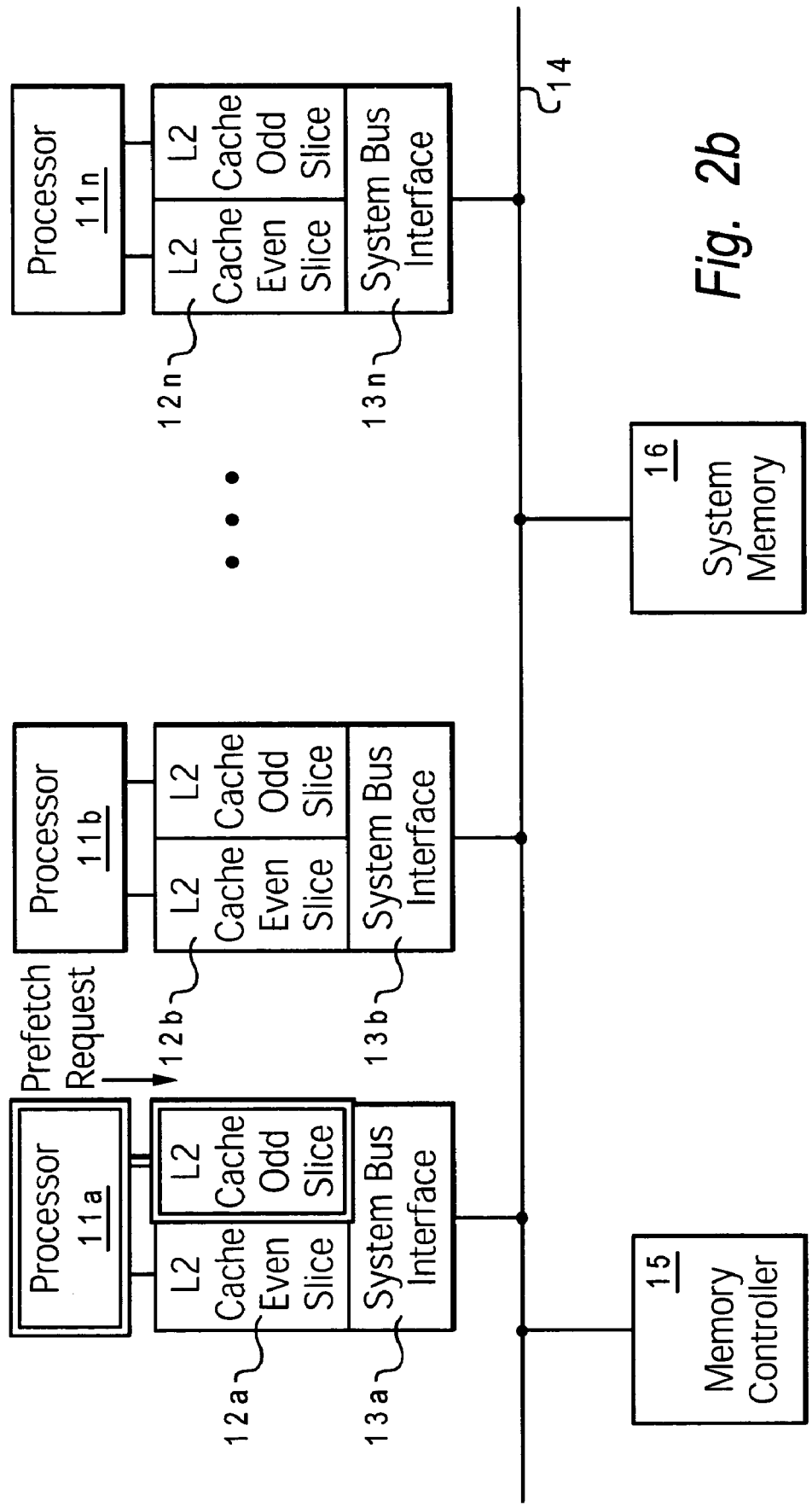

With reference now to FIGS. 2a-2g, there are graphically illustrated a method for performing data prefetch in multiprocessor system 10, in accordance with a preferred embodiment of the present invention. First, one of processors 11a-11n generates a data prefetch request to its associated L2 cache memory, preferably one prefetch request per cache line. For example, since L2 cache memory 12a has two slices (i.e., two separate cache lines), when processor 11a generates data prefetch requests to L2 cache memory 12a, processor 11a has to generate two separate prefetch requests, with each prefetch request for one of the two cache lines. Processor 11a guarantees that the two prefetch requests are issued in a pair, with the first prefetch request to the even slice, as shown in FIG. 2a, and the second prefetch request to the odd slice, as depicted in FIG. 2b.

Figure 2C:
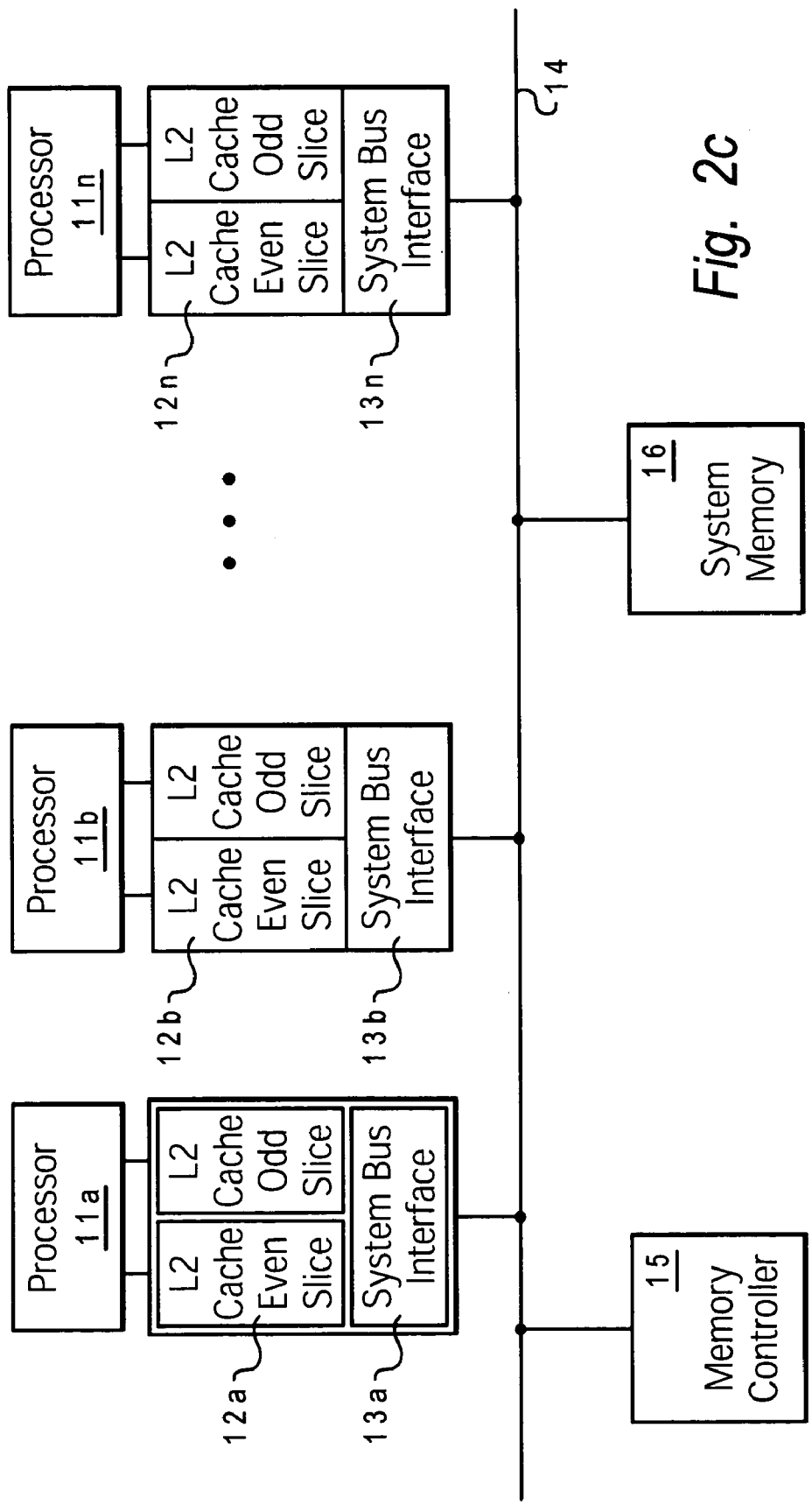
Figure 2D:
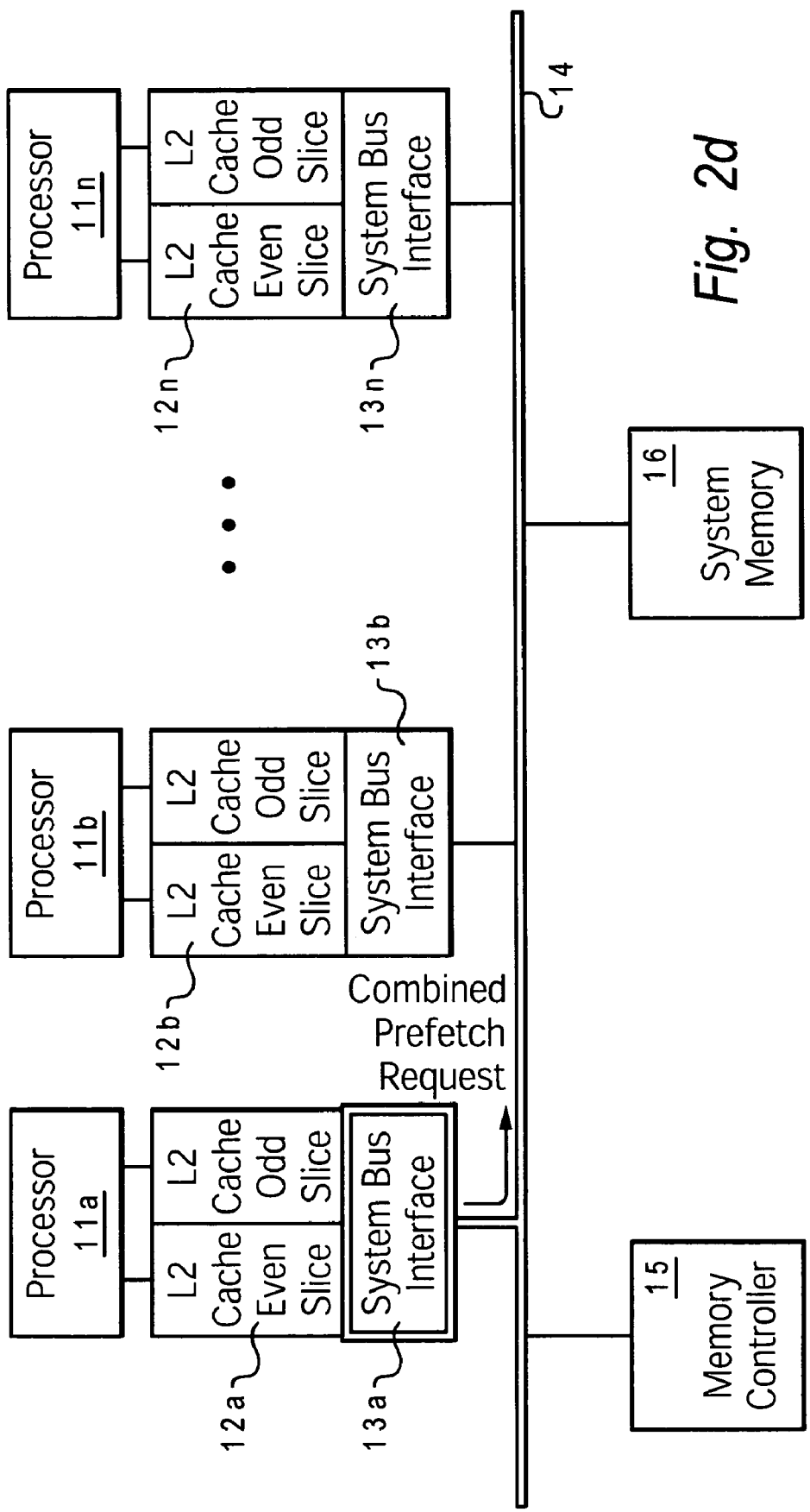

If both prefetch requests from processor 11a miss L2 cache memory 12 (i.e., L2 cache memory 12a does not have the data for any of the two prefetch requests), the two prefetch requests are merged into one single data prefetch request. For example, if both the even cache line prefetch request and the corresponding odd cache line prefetch request miss L2 cache memory 12a, the two prefetch requests are merged into one single prefetch request by system bus interface 13a, as shown in FIG. 2c. System bus interface 13a then sends the combined prefetch request to system interconnect 14, as depicted in FIG. 2d.

Figure 2E:
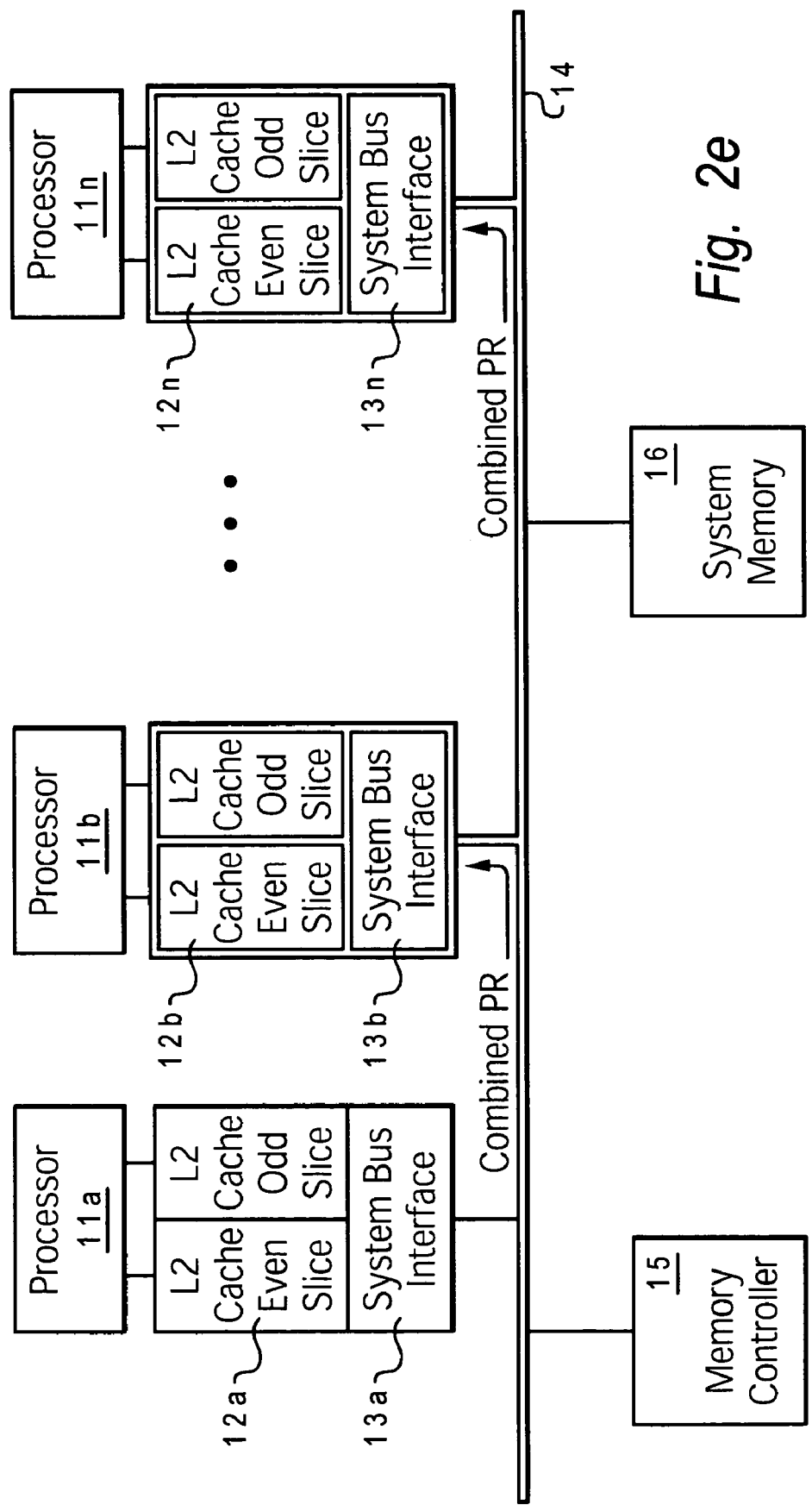

The combined prefetch request on system interconnect 14 is subsequently snooped by the non-requesting processors to their respective cache memory. For example, non-requesting processors 11b-11n snoop the combined prefetch request from system interconnect 14 to their respective one of cache memories 12b-12n, as shown in FIG. 2e.

Since each of cache memories 12b-12n also has a two-slice configuration, each portion of the combined prefetch request is sent to the respective slice of the cache memory. If any one of cache memories 12b-12n has a conflict copy of the data for the combined prefetch request, a snoop response is provided with enough granularity to indicate to memory controller 15 which of the prefetch requests is getting data from one of cache memories 12a-12n via cache intervention and which of the prefetch requests is getting data from system memory 16. Alternatively, a special snoop response called "retry_split" is provided to cause processor 11a to reissue the entire prefetch request as multiple individual prefetch requests.

Figure 2F:
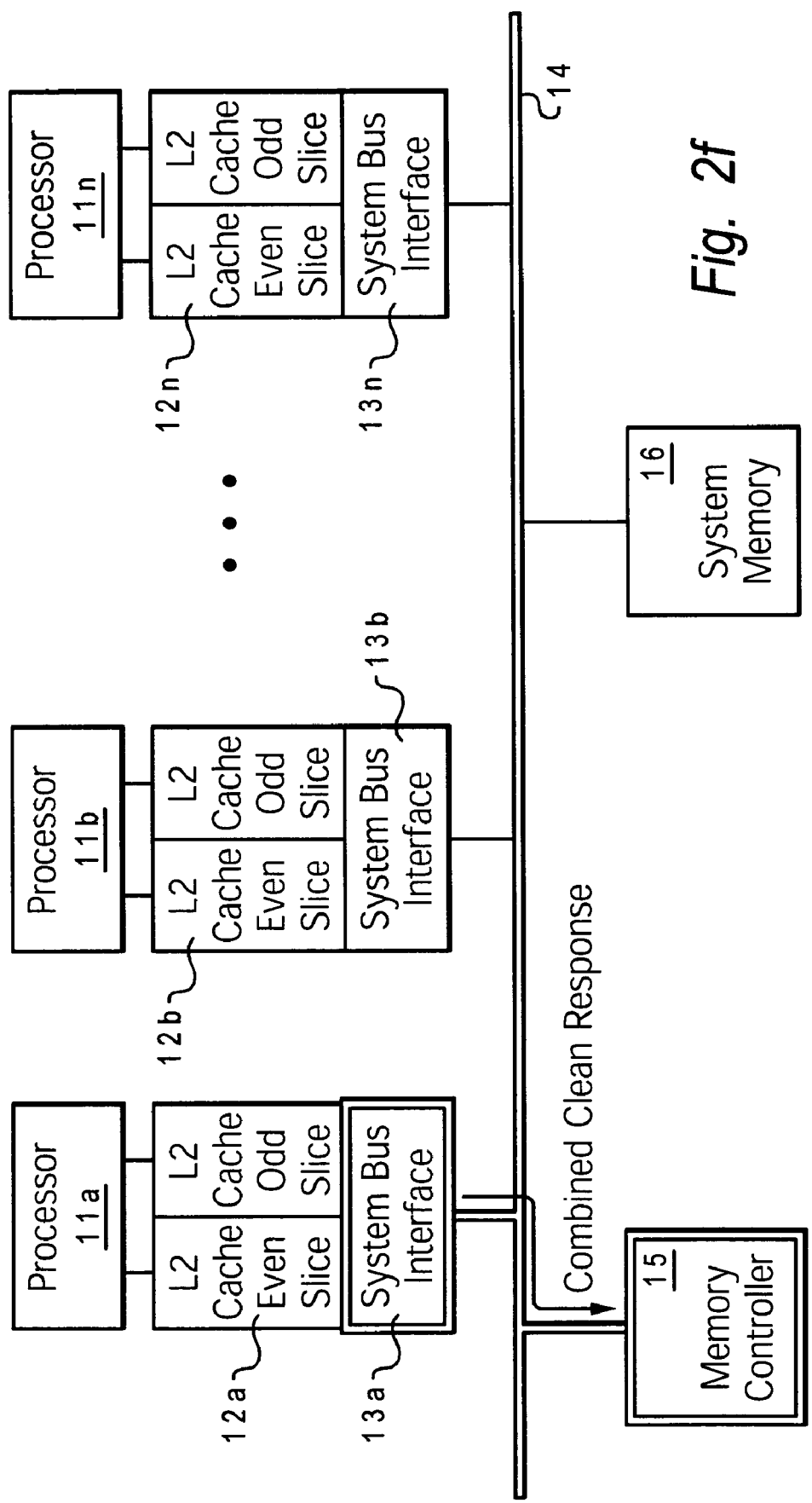

Otherwise, if none of cache memories 12b-12n has the data for the combined prefetch request, each of cache memories 12b-12n will issue a clean response to system interconnect 14 after the responses from the two slices have been merged within each of cache memories 12b-12n. After the receipt of a merged clean response from each of cache memories 12b-12n, system bus interface 13a can issue the combine clean response to memory controller 15 to allow memory controller 15 to obtain the request data from system memory 16, as shown in FIG. 2f.

Memory controller 15 then performs a Read operation on system memory 16. Memory controller 15 preferably reads two cache lines's worth of data from system memory 16 by using a Page mode access because Page mode access saves power as compared to sequential non-Page mode accesses. System memory 16 is preferably organized to allow the data for the second cache line to be read in the Page mode while the page still open after from reading the data for the first cache line. As a result, power consumption of system memory 16 is reduced.

Memory controller 15 subsequently delivers the request data for the two cache lines to system bus interface 13a. Next, the request data for the two cache lines are sent to the corresponding slices of L2 cache memory 12a, as depicted in FIG. 2g.

Referring now to FIG. 3, there is illustrated a block diagram of a prefetch request, in accordance with a preferred embodiment of the present invention. As shown, a prefetch request 30 includes a prefetch opcode field 31, an address field 32, a stride field 33 and a length field 34. Prefetch opcode field 31 defines the request as a data prefetch request. Address field 32 contains the address of system memory 16 (from FIG. 1) in which the prefetch data are stored.

Stride field 33 and length field 34 are optionally fields. Stride field 33 and length field 34 allow a stride number and a length, respectively, to be associated with the prefetch data address such as multiple groups of data can be simultaneously fetched without making additional request.

As has been described, the present invention provides an improved method and apparatus for performing data prefetch request in a multiprocessor system. Although a multi-line data prefetch request for two cache lines is used to illustrate the present invention, it is understood by those skilled in the art that the multi-line data prefetch request of the present invention can be extended to more than two cache lines, such as four or more cache lines.

With more than two cache lines, the simplest design is to allow each cache memory to have as many address-interleaved slices as there are cache lines in a multi-line prefetch request, so that each slice snoops its own portion of the multi-line prefetch request as if it was snooping a single-line prefetch request.

A processor does not have to guarantee that the prefetch request to the slice of the L2 cache memory in any predefined quantity. A processor can generate a single-line prefetch request that the L2 cache memory slices forward to a system bus interface controller. If compatible requests from multiple L2 cache memory slices are received close enough together in time, they are merged into a single prefetch request on a system interconnect bus.

It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for performing data prefetch in a multiprocessor system, said method comprising:
    providing each processor within said multiprocessor system with a cache memory, wherein each cache line within said cache memory is formed by a first sub-cache line and a second sub-cache line;
    issuing a pair of prefetch requests by a requesting processor to its cache memory, wherein one of said prefetch requests is for said first sub-cache line and another one of said prefetch requests is for said second sub-cache line;
    in response to said pair of prefetch requests miss in said cache memory of said requesting processor, merging said pair of prefetch requests into a combined prefetch request;
    sending said combined prefetch request to cache memories of all non-requesting processors; and
    in response to a combined clean response from cache memories of all non-requesting processors, obtaining data for said combined prefetch request from a system memory.

2. The method of claim 1, wherein said requesting processor guarantees that said pair of prefetch requests are issued together.

3. The method of claim 1, wherein said first sub-cache line and said second sub-cache line together are considered as one cache line.

4. The method of claim 1, wherein said method further includes in response to a cache memory of any one of said non-requesting processors has a conflict copy of data for said combined prefetch request, sending a snoop response to a memory controller to indicate one portion of said combined prefetch request is getting data from a cache memory of one of said non-requesting processors and another portion of said combined prefetch request is getting data from said system memory.

5. The method of claim 4, wherein said one portion of said combined prefetch request is getting data from a cache memory of one of said non-requesting processors via a cache intervention process.

6. An apparatus for performing data prefetch in a multiprocessor system, said apparatus comprising:
- a plurality of processors, each having a cache memory, wherein each cache line within said cache memory is formed by a first sub-cache line and a second sub-cache line;
- means for issuing a pair of prefetch requests by a requesting processor to its cache memory, wherein one of said prefetch requests is for said first sub-cache line and another one of said prefetch requests is for said second sub-cache line;
- means for, in response to said pair of prefetch requests miss in said cache memory of said requesting processor, merging said pair of prefetch requests into a combined prefetch request;
- means for sending said combined prefetch request to cache memories of all non-requesting processors; and
- in response to a combined clean response from cache memories of all non-requesting processors, means for obtaining data for said combined prefetch request from a system memory.

7. The apparatus of claim 6, wherein said requesting processor guarantees that said pair of prefetch requests are issued together.

8. The apparatus of claim 6, wherein said first sub-cache line and said second sub-cache line together are considered as one cache line.

9. The apparatus of claim 6, wherein said apparatus further includes in response to a cache memory of any one of said non-requesting processors has a conflict copy of data for said combined prefetch request, means for sending a snoop response to a memory controller to indicate one portion of said combined prefetch request is getting data from a cache memory of one of said non-requesting processors and another portion of said combined prefetch request is getting data from said system memory.

10. The apparatus of claim 9, wherein said one portion of said combined prefetch request is getting data from a cache memory of one of said non-requesting processors via a cache intervention process.

11. A computer storage medium having a computer program product for performing data prefetch in a multiprocessor system, wherein said multiprocessor system includes a plurality of processors, each having a cache memory, said computer storage medium comprising:
- computer program code for issuing a pair of prefetch requests by a requesting processor to its cache memory, wherein each cache line within said cache memory is formed by a first sub-cache line and a second sub-cache line, wherein one of said prefetch requests is for said first sub-cache line and another one of said prefetch requests is for said second sub-cache line;
- computer program code for, in response to said pair of prefetch requests miss in said cache memory of said requesting processor, merging said pair of prefetch requests into a combined prefetch request;
- computer program code for sending said combined prefetch request to cache memories of all non-requesting processors; and
- computer program code for, in response to a combined clean response from cache memories of all non-requesting processors, obtaining data for said combined prefetch request from a system memory.

12. The computer storage medium of claim 11, wherein said requesting processor guarantees that said pair of prefetch requests are issued together.

13. The computer storage medium of claim 11, wherein said first sub-cache line and said second sub-cache line together are considered as one cache line.

14. The computer storage medium of claim 11, wherein said computer program product further includes in response to a cache memory of any one of said non-requesting processors has a conflict copy of data for said combined prefetch request, program code means for sending a snoop response to a memory controller to indicate one portion of said combined prefetch request is getting data from a cache memory of one of said non-requesting processors and another portion of said combined prefetch request is getting data from said system memory.

15. The computer storage medium of claim 14, wherein said one portion of said combined prefetch request is getting data from a cache memory of one of said non-requesting processors via a cache intervention process.

* * * * *